D. Skidmore,
Knob Attachment.

No. 2,941. Reissued May 19, 1868.

Witnesses
R. F. Osgood
D. C. Johnson

Inventor:
Darius Skidmore
by J. Fraser Hee Attys

N. PETERS, PHOTO-LITHOGRAPHER, WASHINGTON, D. C.

United States Patent Office.

DARIUS SKIDMORE, OF SENECA FALLS, NEW YORK.

*Letters Patent No.* 35,899, *dated July* 15, 1862; *reissue No.* 2,473, *dated February* 5, 1867; *reissue No.* 2,941, *dated May* 19, 1868.

IMPROVEMENT IN ATTACHING DOOR-KNOBS TO SPINDLES.

The Schedule referred to in these Letters Patent and making part of the same.

TO ALL WHOM IT MAY CONCERN:

Be it known that I, DARIUS SKIDMORE, of Seneca Falls, in the county of Seneca, and State of New York, did invent a new and useful Improvement in Fastening the Shanks of Door-Knobs, for which Letters Patent of the United States were granted on July 15, 1862; and I do hereby declare that the following is a full, clear, and exact description thereof, reference being made to the accompanying drawings, making part of this specification, in which—

Figure 1:
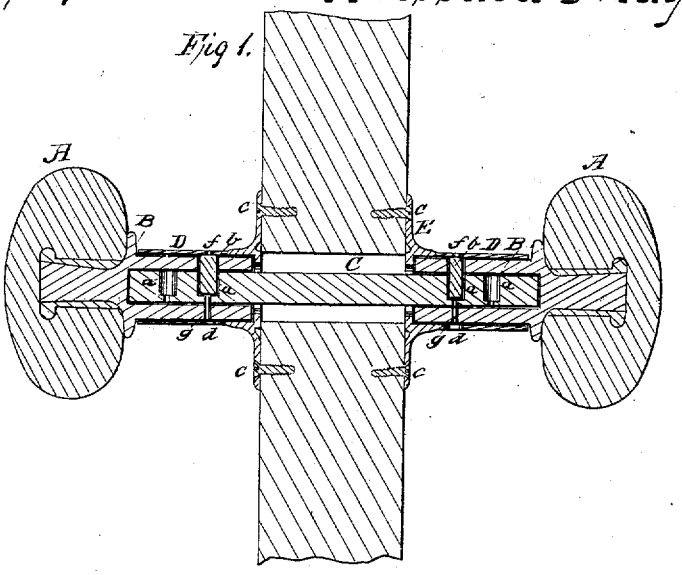

Figure 1 is a central longitudinal section of a door-knob arranged in my improved manner, and applied to a door.

Figure 2:
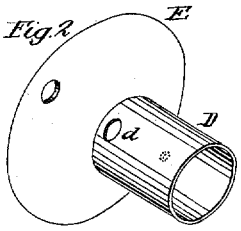

Figure 2, a perspective view of the socket or sleeve and the rose or flange.

Figure 3:
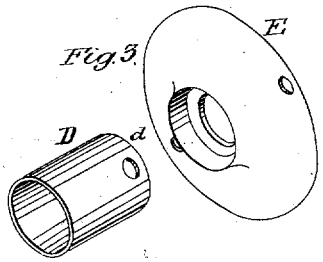

Figure 3, a view similar to fig. 2, but showing a modification.

Similar letters of reference indicate corresponding parts.

The object of this invention is to prevent the pin or screw, which fastens the door-knob to the spindle, from dropping out, and the invention consists in providing the rose of the knob with a socket or sleeve, so arranged that it will either wholly or partly cover the head of the fastening-pin or screw, and hold it in place.

The general construction of the door-knob is as usual, consisting of hand-knobs A A, secured to shanks B B, which are coupled to the spindle C, that passes through the door and operates the bolt. The usual holes *a a* are made in the spindle and shank, which holes, when coincident, receive the usual fastening-pin or screw *b*.

Over the shank B fits the rose or flange E, secured to the door by screws in the usual way.

In figs. 1 and 2, the rose is shown with my improved socket or sleeve D projecting outward sufficiently to cover the top of the fastening *b*. In fig. 3 the socket or sleeve is shown as made separate and independent of the rose, and resting simply on the shank. This is simply an equivalent of the form at first described, and in fact any form of the rose that will cover the fastening *b* may be employed. The socket or sleeve D may have a slot or hole, *d*, corresponding in position with the fastening *b*.

Thus arrranged, the fastening *b* is always securely held in position.

Having described my invention, I claim as new, and desire to secure by Letters Patent—

Covering or enclosing the end of the coupling-device of the knob-shank and spindle wholly or partially by the socket or sleeve of the rose, substantially as and for the purpose herein specified.

DARIUS SKIDMORE.

Witnesses:

A. B. WOODEN,

P. CONLEY.